United States Patent [19]

Lee

[11] 3,727,579

[45] Apr. 17, 1973

[54] LOBSTER PRESERVATION SYSTEM
[75] Inventor: James O. Lee, Old Saybrook, Conn.
[73] Assignees: Olaf M. Olsen, Old Saybrook; John L. McCarthy, Old Lyme, Conn.
[22] Filed: Dec. 21, 1970
[21] Appl. No.: 100,195

[52] U.S. Cl. .............................................. 119/2, 119/5
[51] Int. Cl. ........................................................ A01k 61/00
[58] Field of Search .................................... 119/2, 3, 5

[56] References Cited

UNITED STATES PATENTS

| | | |
|---|---|---|
| 2,302,336 | 11/1942 | MacDonald ........................... 119/2 |
| 485,422 | 11/1892 | McGray ................................. 119/2 |
| 881,488 | 3/1908 | Rochow ................................. 119/5 |
| 376,553 | 1/1888 | Sanford ................................. 119/3 |
| 1,248,169 | 11/1917 | Schnoor ................................ 119/5 |
| 3,025,831 | 3/1962 | Berardi ................................. 119/2 |
| 899,057 | 9/1908 | Kleinschmidt ........................ 119/5 |

FOREIGN PATENTS OR APPLICATIONS

721,538  11/1965  Canada ..................................119/3

Primary Examiner—Antonio F. Guida
Assistant Examiner—James H. Czerwonky
Attorney—Sol B. Wiczer

[57] ABSTRACT

Fresh-caught lobsters are mounted in quick-connect containers for connection into or removal from a system, and transfer to at least one other similar system. The system provides temperature-conditioned aerated salt water which is continuously sprayed upon the lobster in the container from the time it is caught until it is finally sold. The lobsters are disposed in the container on foraminous trays having large, unobstructed, open mesh screen surfaces through which spray water and lobster waste continuously drain. Each tray is sprayed, and the spray water passes immediately through the open mesh surfaces of the trays so as not to accumulate thereon.

11 Claims, 7 Drawing Figures

INVENTOR
JAMES O. LEE

BY Sol B Wicjer
ATTORNEY

INVENTOR
JAMES O. LEE

BY Sol B. Wiczer
ATTORNEY

LOBSTER PRESERVATION SYSTEM

This invention relates to a storage and transportation system for live lobsters, to maintain them in a condition of good health, and the lobster meat in high quality as available from live, fresh-caught, healthy lobsters for substantially extended time periods.

More particularly, the method and apparatus are directed to a system of preserving live lobsters supported upon trays or cages in portable, quick-attachable containers for transfer from boat to truck to storage, each comprising a complete system into which the container is integrated. The live lobsters in each container are continuously sprayed with oxygen-containing salt water in a manner to wet and continuously wash the surfaces of the live lobsters with life-sustaining oxygenated salt water, maintained at a temperature controlled to correspond to a selected temperature, and preferably substantially corresponding to their natural habitat. The salt water contains oxygen supplied under pressure with an oxygen-containing gas sufficient to impart a life-sustaining quantity of at least 4 parts per million of dissolved oxygen to the salt water being sprayed.

Many attempts have been made in the art to preserve live lobsters, generally by immersing and even maintaining a moist fog upon a whole lobster, whereby it is wet with water and salt water, but the life of a lobster thus preserved was extremely short, a few days at most. It has also been proposed to store the lobster packaged in ice, wet sawdust or seaweed; or, even better, in containers through which moist air is circulated with refrigeration. In contrast, the present method will preserve the lobster many weeks in healthy condition.

In one aspect of this invention, the lobsters are mounted in a readily-storable and transferrable container comprising foraminous trays upon which the lobsters are disposed, the trays being supported separately in a tier within the container. The container is constructed with means for being quickly connected and disconnected into a system which provides within the container a continuous, fine spray of aerated salt water at a temperature and composition controlled to approximate the lobster's native conditions. In this manner the live lobsters are allowed maximum exposure to the aerated salt water spray, applied substantially continuously upon their bodies for the total storage and transportation periods. The containers may be quick connected and disconnected to ducting comprising the system, which provides the continuous filtered temperature-controlled and aerated salt water applied to the lobsters as a continuous spray. There are drains cooperative with the containers for continuous withdrawal of the spray and lobster wastes from the container.

Such system includes containers of lobsters quick connected for lobster storage aboard ship as they are caught, quick disconnected and reconnected into a similar portable system aboard trucks, railroad cars and air craft for transport, and thence into the same system disposed in a warehouse or in sales counters. The containers in storage and transport are always connected into the same kind of system for continuous spray of the live lobsters over the total life period from the time the lobsters are caught and immediately placed in the containers, transported to storage or sales places, up to the time they are withdrawn from the container and sold as healthy, live lobsters. Since the life of the lobster according to the present system may exceed several weeks and up to about two or three months, the system becomes feasible to maintain the lobsters alive even for relatively long storage and transport periods within such time spans.

In another novel aspect of the present invention, containers are provided which include ducting disposed vertically through one or several trays upon which the lobsters are disposed, and the ducting includes nozzles pointed radially downward upon the lobsters for continuous wetting by direct spraying of the lobsters' surfaces with a fine spray of aerated salt water continuously as a life-maintaining fluid for the lobsters.

In a third novel aspect of this invention, the system hereof comprises a source of salt water —natural or artificial— desirably approximating a sea water corresponding to that of the lobster's native habitat in composition, and usually having a salt content in the range of about 20 to 40 parts per thousand, coupled with means for flowing or spraying fresh filtered sea water or salt water from storage under pressure for spraying. The system includes means for supplying air, including oxygen or an oxygen-evolving composition such as ozone under pressure to the water, whereby the water will be aerated with the oxygen-containing gas under pressure to impart to the salt water at least 4 parts per million of dissolved oxygen, the oxygen content ranging upward to a preferred 10 parts per million of dissolved oxygen. Such system includes means for refrigerating to control the temperature of the water to a preferred natural habitat temperature ranging from about 30° F up to about 77° F.

The system further includes means for filtering the sea water, when natural, to remove natural sea water containing impurities; and, sometimes after aeration and pumping, the water is filtered again before use to exclude any possible contaminants that may be imparted in operation of the system from mechanical elements, such as pumps and compressors. The aerated water under a spraying pressure of at least 10 psig and usually in the range of 50 to 200 psig is continuously sprayed at the selected temperature upon the lobster disposed in the container.

Lobsters generally are of "inshore" type whose native habitat includes normal temperature variations from about freezing up to about 77° F, this type thriving best in the range of 41° F to 77° F. However, for temperature control for optimum handling of the "inshore" lobster, it is preferred to select the temperature at which the lobster was caught, varying it within the stated range only slowly over considerable periods of time, avoiding any sharp temperature changes.

The alternate "offshore" type of lobster is larger, inhabits deeper waters, and its natural water temperature ranges from about 30° F to 45° F, a preferred temperature range, and this type will not tolerate temperatures exceeding 50° F for substantial periods of time. Again, it is preferred to maintain lobsters within the stated preferred range in any case, and substantially at the temperature of the water in which the lobster was caught.

The inshore lobster can tolerate substantial salt concentration variations within the above-stated range up to about 40 parts per thousand (4 percent); and, in any case, can tolerate above a minimum of 20 parts per thousand (2 percent). The offshore lobster, however, is preferably maintained close to its optimum salt concentration of about 2½ percent and will not tolerate concentrations substantially below or above this range. For instance, the lobster will not tolerate concentrations higher than 3 percent or lower than 2 percent for substantial periods of time. A preferred salt range for these offshore lobsters is about 2.2 to 2.8 percent salt concentration for long time storage periods.

It is preferred, in any case, to use natural brine which has been filtered to remove both natural as well as artificially-introduced impurities. However, there are various known formulas for producing artificial brines comprising water made up to a salt content approximating that of natural brine. For this purpose a 22 parts by weight salt batch to form a synthetic salt water comprises 14.52 parts of sodium chloride; 3.52 parts of magnesium sulfate; 2.86 parts of magnesium chloride; 0.7 parts of calcium chloride; and 0.33 parts of potassium chloride as the major salt components dissolved in 1,000 parts of water, sufficient to form a 2.2 percent solution in a typically-useful synthetic brine for both types of lobsters. Natural sea water, however, contains trace quantities of many other salts. This synthetic salt as formulated can be dissolved in larger or smaller quantities of water to form a brine solution whose salt content will be in the range as stated above.

The water is aerated under substantial pressure to introduce a substantial saturation content of oxygen in the water in the selected temperature range at a pressure from 10 to 200 psig. The dissolution of the oxygen in the water under such pressure may be effected by mechanically compressing the air or oxygen and aerating the water as by bubbling the air or other oxygen source through the water under that pressure to dissolve the oxygen in the water in the desired quantity, as stated.

In an alternate method, air or oxygen stored compressed in cylinders may be a suitable source with which the water may be aerated under pressure. Water may be independently pumped and aerated, or the aeration per se may form the source of power to flow the air into the water and pass the aerated solution through nozzles as an aerated spray upon the live lobsters. The operation in the manner described will produce a saturation condition of dissolved oxygen at absolute quantity, being variable with both the pressure applied as well as the temperature of the water.

The invention is further described with respect to the drawings wherein.

Figures 1, 6, 7:
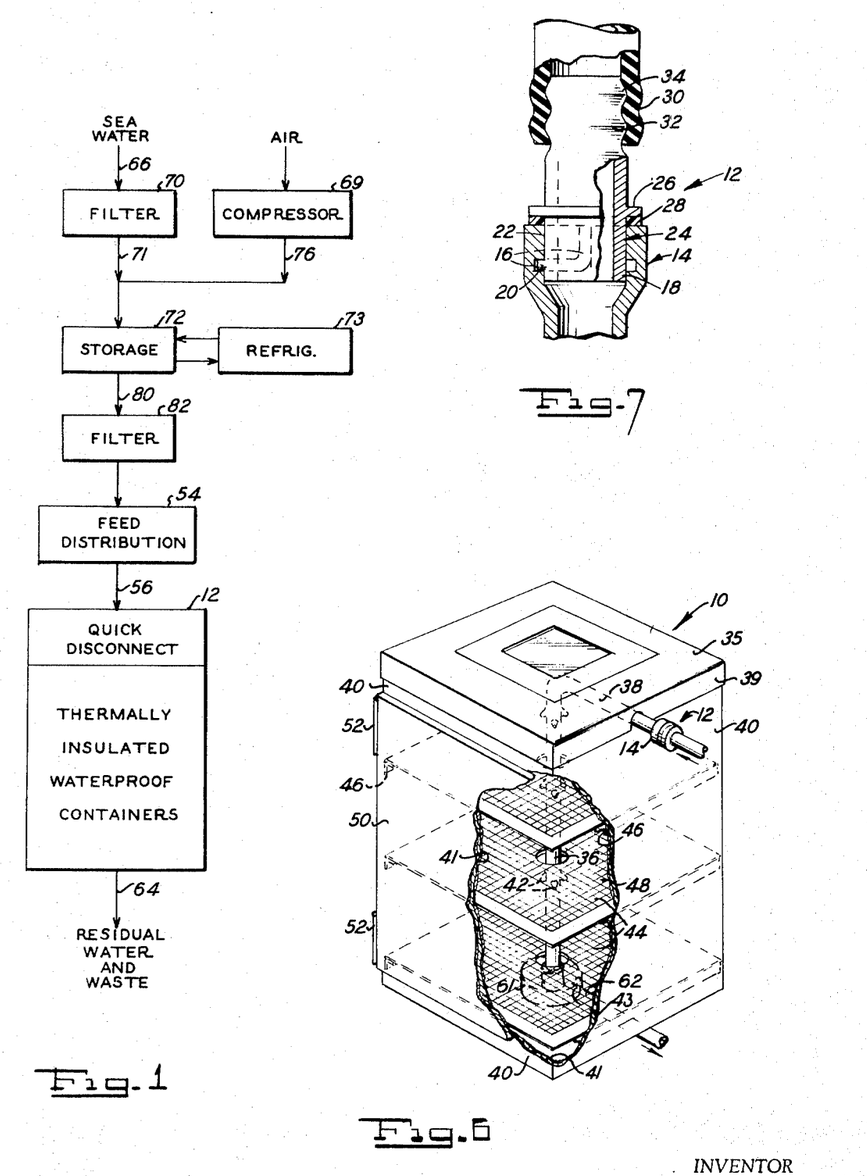
FIG. 1 shows a flow diagram for the system.
FIG. 6 illustrates a single container depicting the arrangement of trays in said system.
FIG. 7 is a detail showing a quick-disconnect coupling in the form of a bayonet joint.

Referring first to FIG. 6, a portable container 10, shown here to be rectangular, but which may be cylindrical or other desirable shape, is fitted with a quick-disconnect coupling member 12. The coupling member 12, as shown in detail in FIG. 7, may be merely a bayonet joint but other known types of quick-disconnect joint members may be substituted. Such joint is formed between a female coupling member 14, having a helical groove 16 cut into the cylindrical wall 18 thereof, which will receive a projecting pin 20 mounted normal to or upright from the cylindrical inner wall 22 of a male coupling member 24. The male member may have a flange 26 and a resilient gasket 28, so that by twisting of the female coupling member the joint is coupled and uncoupled. While either the male or female coupling member may be rotatable loosely, in some known constructions, it is preferred to attach the male coupling member 24 to resilient ducting such as a rubber hose 30, which will accommodate any twisting motion for purposes of coupling and uncoupling. The coupling member for this purpose may be fastened as by a rough-threaded plug member 32, to the rubber hose-type duct 30, secured thereto by large, steep-pitched threads 34, frictionally engaging the upper hose end 30 in a conventional manner.

The container 10 has centrally mounted a duct 36 which extends vertically through the center of the container to a point near the top thereof, where it bends to join a horizontal duct 38. The duct 38 passes through a slot cut through the side 39 of the cover 35, and the duct terminates in the female coupling member 14 of the quick-disconnect joint 12.

The container 10 comprises a top closure member 35 which frictionally fits upon four rectangular side walls 40, the walls being suitably heat insulated by a lining 41, which may comprise an extra layer of metal as an inner liner, and having supporting insulating sheet 43 between inner and outer layers. The vertical body of the duct 36 is fitted with several nozzle-like projections 42, each disposed a few inches above an unobstructed, open mesh screen-like tray member 44, said nozzles projecting a fine spray of liquid angularly downward and radially in all directions to continuously wet lobsters disposed upon each tray member 44. The several tray members 44 are mounted in a vertical tier, each supported upon the inner walls 40 of the container, upon angle iron or bracketing members 46 to be supported vertically thereon only by their gravitational weight. The centers of each tray comprise foraminous screening 48 except in the area of the duct 36 which is annularly open to allow the duct 36 to pass downward from the top of the container through the center of the several layers of screen, as shown. As clearly illustrated in FIG. 6, the foraminous open mesh screening 48 permits the spray water to pass immediately through each tray member 44, so as not to accumulate on thereon. A door 50 is fastened to one side 40 and is supported by hinges 52 for swinging movement to open horizontally, allowing the trays with lobsters thereon to be filled into and removed from the container 10 to rest upon brackets 46.

After positioning of the several trays therein, the duct 36 attached is inserted vertically downward followed by lowering the cover member 35 to position and secure the duct 36 as shown centrally of the several screens in spray position, with the nozzles in spray position upon the screens. The movement of the duct 36 for insertion and removal together with the cover is effected with the coupling member 12 uncoupled. After assembling of the container, the lobsters can be individually added to or removed from the trays from time to time by opening the door 50. Upon removal of duct 36, the entire tray may be inserted or removed from the container.

The container is then quick coupled into a system comprising numerous containers 10. Such system, as shown diagrammatically in FIG. 2, comprises several containers 10, each quick coupled through coupling members 12 to a system comprising a main duct 54 branching into branch ducts 56, each branching duct 56 communicating with a duct 58 servicing two containers 10. The duct 58 is fitted with valves 60, each of which can be closed when the container is being removed by uncoupling the quick-coupling member 12.

Figure 2:
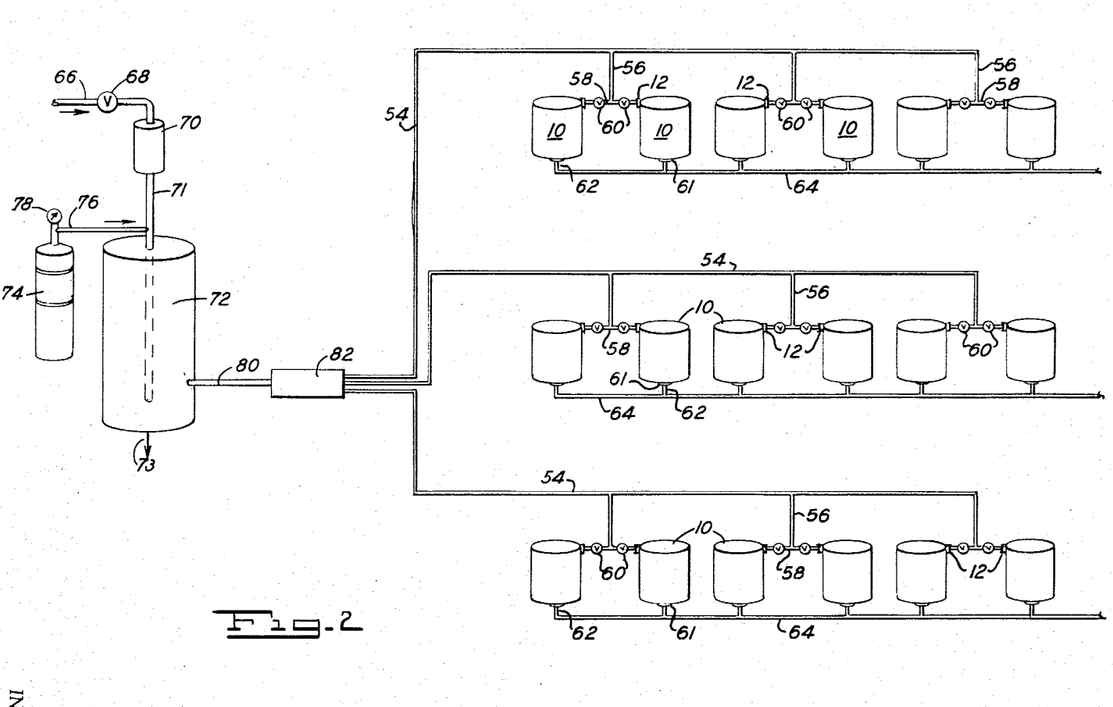
FIG. 2 is a schematic view showing several containers interconnected into a system.

Drain outlets 62 cooperate with a drain outlet 61 in the bottom of each container through which water and waste from the lobster is continuously washed and dripped into outlet ducts 62 which join a main drain pipe 64, leading out of the system for waste and water disposal.

The system also comprises a source of sea water [not shown] which is passed into a duct 66 controlled by a valve 68, passing thence to a first filter 70 and to an intermediate reservoir 72. A source of compressed air or oxygen 74 feeds oxygen under selected pressure through a duct 76, controlled under pressure by a gauge 78. The gas joins and aerates the liquid passing through a duct 71, passing thence to the intermediate storage tank 72. Brine from storage tank 72 is circulated to a refrigerating device [not shown] through line 73 for close temperature control. The brine is withdrawn under pressure of the gas in storage tank 72 by way of duct 80, passing into main feed lines 54 for spray distribution into each of the containers, valves 60 being open. A second intermediate filter 82 is sometimes usefully placed in duct 80, particularly where circulating pumps or air compressors are used to effect the spraying, the second filter 82 being used to remove any possible contamination from such alternately used mechanical elements.

Figure 3:
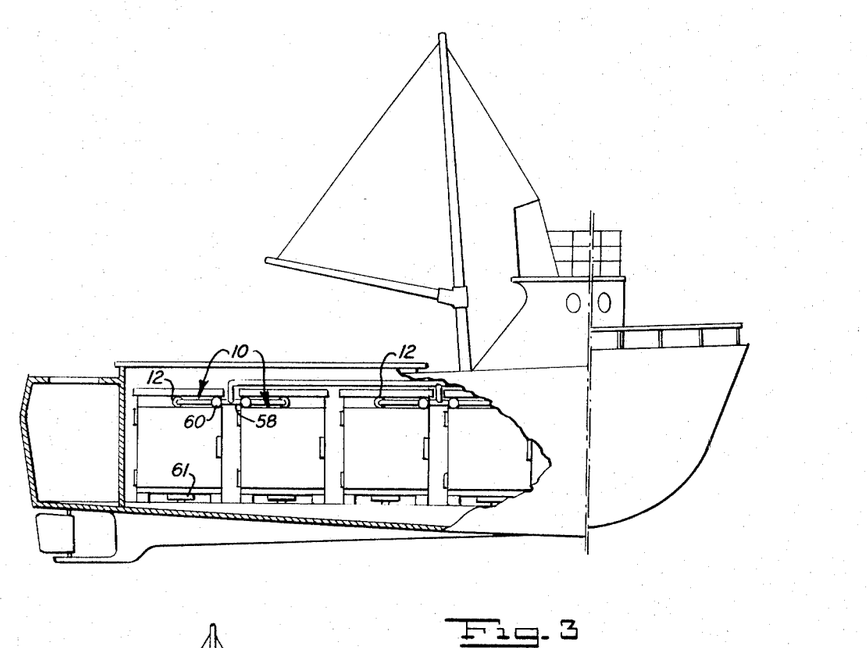
FIG. 3 illustrates schematically mounting of a group of containers in a shipboard system.
Figure 4:
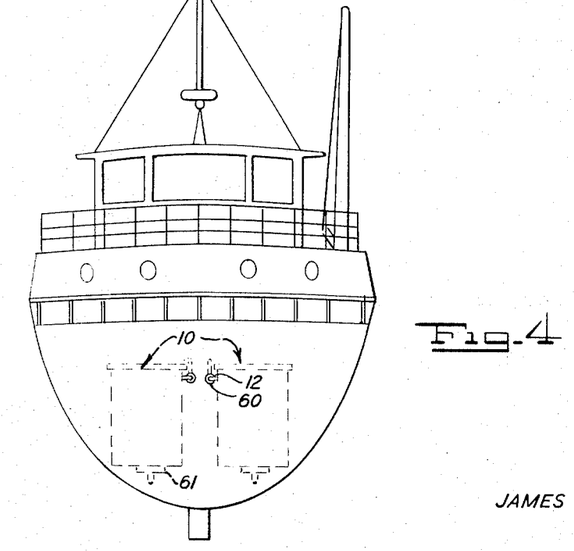
FIG. 4 is an end view of the ship of FIG. 3.
Figure 5:
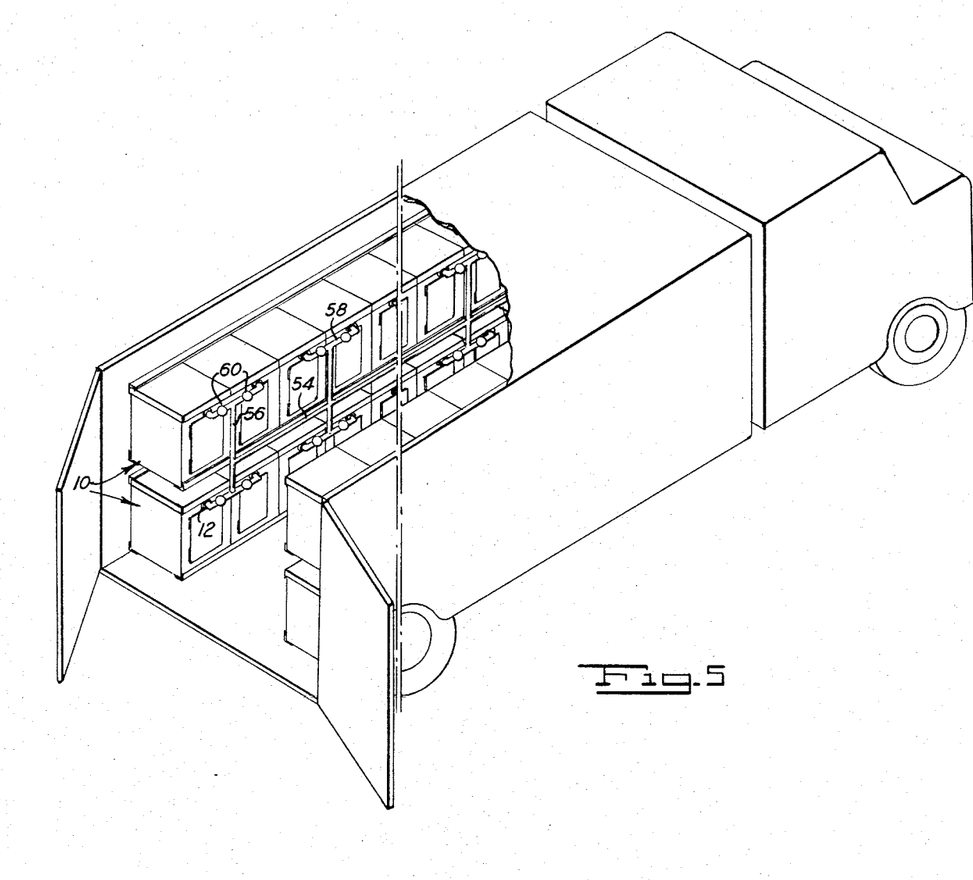
FIG. 5 illustrates a system of mounting containers in a truck.

The system shown in FIG. 2 is mounted as duplicated systems on the boat where lobsters are being caught, the fresh-caught lobsters being inserted into the containers 10, and quick connected into the system as shown in FIG. 2. Such system is mounted in a boat, as shown in FIGS. 3 and 4, each lobster being emplaced upon a tray and sprayed through the nozzles 42 continuously from the time they are caught, with a life-sustaining supply of a light coditioned spray of aerated salt water. As the catch increases from day to day, the lobsters remain alive by being continuously sprayed with sea water under pressure and at controlled temperature. Then the catch is brought into port after several days or even weeks, the containers being then transferred by quick disconnecting and reconnecting into a similar system mounted for transportation in a truck overland as shown in FIG. 5. As on the ship, the containers mounted in the truck are quick connected to the system for continuous spray of aerated salt water in controlled temperature and pressure as they are being transported.

Similarly, the transported catch is then transferred to the same system disposed in a warehouse, where they may be further stored, or reconnected directly to a similar system in a market where they are being sold, each container being connected to the system and continuously being sprayed with a life-sustaining aerated spray of salt water and the lobsters are maintained at controlled temperature until they are actually sold. Such process which may cover a period of several weeks of maintenance of the live lobsters from the time they are caught until the time they are distributed by actual sale to the user, provides continuous spraying except for the few minutes that the containers are disconnected from one system and reconnected into another. Hence, the lobsters are maintained continuously alive by substantially continuously spraying with the temperature controlled and aerated salt water.

FIG. 1 shows the system diagrammatically, indicating in process terms how it is operated. For instance, the sea water passes through a line 66 to a first filter 70; and air from a compressor 69, or as shown in FIG. 2, from a compressed oxygen or air tank 74, passes through line 76 to join filtered sea water passing through duct 71 and thence to a storage tank 72. The storage tank 72 is connected with a refrigeration means 73 which withdraws a portion of the aerated water and cools it to a preselected desired temperature, whereby the brine in storage tank 72 is aerated under selected pressure and controlled to a desired temperature. It is withdrawn by way of line 80 and sent through a second filter 82, passing thence into said distribution lines 54 and 56, and finally passing by way of quick-disconnect joint 12 for spray into the thermally-insulated waterproof containers. Residual water and wastes are withdrawn and disposed of extraneously through line 64.

The operation of the system is further described in the following examples:

EXAMPLE I

Inshore small rock lobster harvested from a depth of about one to five fathoms at a temperature ranging from about 60° F to 75° F are placed upon trays immediately as caught in a container with sufficient spacing between lobsters to allow free wetting with the continuously-applied spray of salt water. The salt water is the natural brine of the area in which the lobster was caught, or a synthetic brine of the type described above, containing about 30 parts per thousand of said synthetic salt mixture. When first caught, the temperature of the spray water is adjusted to approximately the temperature of the water in which the lobster originally existed; but, thereafter, the temperature is gradually lowered by cooling to about 45° F, and is maintained within a 2° F temperature range of the said 45° F for the preserved life of the lobster. The original spray brine which was natural salt water of the lobsters' habitat, is first filtered; the water is then aerated with air from a mechanical air compressor, injecting air into the water at the pressure of about 50 pounds per square inch; and the aerated water is passed into a storage tank from which the water is then taken for subsequent spraying. The temperature of the water in the storage tank is adjusted by circulating the water through refrigerator coils to maintain the preselected temperature. The water contains about between 8 and 10 parts per million of dissolved oxygen, maintained under pressure of 50 pounds per square inch as supplied by the compressor. The water is withdrawn from the storage tank and given a second filtration and then passes through nozzles to be evolved as a very light spray at a rate to continuously wet the lobster with the fresh aerated salt water, a spray which is maintained substantially continuously for the life of the lobster in the container. The wash water dripping from the lobster, plus any body wastes, are washed to the bottom of the container and withdrawn through a drain as shown in the system pictured in the drawings and described above, the lobster being continuously sprayed only with the fresh salt water, as thus described. When the catch of the ship or trawler in the containers in which the lobster has been initially stored is complete, and the trawler comes into the harbor, each container having the structure described above is quick disconnected from the salt water spray system and quickly reconnected to the same or similar salt water supply system mounted in a truck, as shown in FIG. 5, for transportation to a point of storage or market. The truck has mounted thereon a similar system to apply a similar spray of salt water, maintained under similar aerating conditions and temperature. Upon arrival at their destination, the containers are again quick disconnected and again reconnected to a similar system for stationary storage or sale.

EXAMPLE II

Offshore large lobster harvested from a depth of 40 to 200 fathoms and caught at a water temperature of about 35° to 40° F, are stored as caught on trays disposed in containers as described above, and sprayed with oxygenated salt water, either the natural brine approximating the water from which they were taken or a synthetic brine containing about 25 parts per thousand of synthetic salt having the composition stated above, the salt water containing about 10 parts per million of dissolved oxygen formed by aerating the salt water with air at a pressure of about 90 pounds per square inch, the water being maintained in the range of 35° to 40° F, close to the exact temperature of the water in which the lobsters were caught. The lobsters are continuously sprayed with a wetting supply of the salt water as they are mounted in said quick-disconnect container aboard the ship, and the containers are then transferred in port to a truck having a similar system in which the same temperature is maintained while the continuous spraying of the lobster in the containers is maintained. Finally, the disconnect containers are integrated into a storage system in a warehouse or at the market, where they are to be sold, and are still continuously sprayed with the same aerated salt water solution until they are sold. The lobsters, even after a couple of weeks, are found to be healthy and the lobster meat is indistinguishable from immediately fresh-caught lobster.

According to the system as herein above described, the lobsters disposed in containers quickly connected into a system, are continuously sprayed over their lifetime from the time they are caught until they are sold, with a life-sustaining supply of natural salt water or one in which the salt is carefully controlled to the range stated above; and at a temperature for inshore lobster in the range of 30° to 77° F with only slow changes of temperature from its natural habitat to that of the refrigerated condition; and, in the case of offshore lobster, the temperature is again preferably that of its natural habitat but is, in no case, greater than about 45° F, as also extensively disclosed above.

As stated, except for the few minutes of connecting and disconnecting the containers in which the lobsters are originally stored, the lobster is continuously maintained under a spray of the aerated salt water containing a life-sustaining quantity of dissolved oxygen of at least 4 parts per million; and the salt water is maintained at the selected temperature.

Certain modifications will occur to those skilled in the art. As indicated, the system may apply to other vehicles such as air craft, and other types of sea vessels or land vehicles.

Moreover, while the invention is primarily directed to the maintenance of lobster, both inshore and offshore types, for extraordinarily long periods of time, the system will also be applicable to other species of shell fish to maintain them alive for indefinitely extended periods. For instance, such shell fish as crab, particularly red crab, shrimp, prawn and krill may be preserved by the present system.

Accordingly, it is intended that the above description be regarded as illustrative and not limiting except as defined in the claims appended hereto.

What is claimed is:

1. The method of preserving fresh caught lobster in live and healthy condition over an extended period of time, comprising supporting said lobster upon foraminous trays having large open mesh surfaces through which spray water and lobster waste may continuously drain and substantially continuously maintaining the live lobster wet by spraying each of said trays while the lobster are supported upon said foraminous surfaces and having their bodies exposed only to said wetting spray, wherein said spray water passes immediately through the open mesh surfaces of said trays, said trays and lobsters thereon being disposed in containers including means for quick-disconnecting and connecting the same for integration and removal for transfer to and from a system, said system providing said spray sufficient to maintain the lobster wet with spray over the total period from the time the lobster is caught until sale with a life-supporting spray of salt water, said salt water spray being selected from the group consisting of natural ocean salt water and synethetic salt water, said synthetic ocean salt water consisting of fresh water having added a salt content in the range of 20 to 40 parts per thousand approximating the salt content composition of natural salt water, said salt water spray being controlled to a temperature in the range of 30° to 77° F for inshore lobster, and 30° to 45° F for offshore lobster, said salt water being treated under pressure with an oxygenated gas prior to spraying upon the lobster to impart a dissolved oxygen content to the water exceeding about 4 parts per million.

2. The method as defined in claim 1 wherein the lobster is an offshore lobster and is sprayed with a salt water selected from the group consisting of approximately natural ocean salt water and a synthetic salt water comprising a mixture of salts added to pure water corresponding in type and quantity to natural salt predominantly found in ocean salt water, said synthetic salt mixture being formed by adding the salt to fresh water in quantity from about 2.2 to 2.8 percent salt by weight, said water being maintained at a temperature in the range of 30° to 45° F and aerated before spraying upon the lobster with an oxygen-containing gas at a pressure of 10 to 200 pounds per square inch.

3. The method as defined in claim 1 wherein the lobster is an inshore lobster and is sprayed with a salt water selected from the group consisting of natural ocean salt water and synthetic ocean salt water containing two to four per cent of salt by weight in fresh water, said salt consisting essentially of salts naturally contained in ocean water, said water being aerated with an oxygen-containing gas to dissolve from about four to ten parts per million of oxygen in said salt water while maintaining the salt water at a temperature of from about 30° to 77° F before spraying.

4. The method as defined in claim 1 wherein the lobster is defined in a portable container and maintained alive by substantially continuously spraying with the life-sustaining spray of said salt water, having the controlled temperature, salt, and oxygen contents from the time it is caught until the time it is sold except for a few minute interruptions while the lobster container is transferred from shipboard where it is placed in the container when caught, to a land transport vehicle, and from said land transport vehicle to stationary storage.

5. The method as defined in claim 4 wherein the lobsters are first disposed in said containers which are connected into a shipboard system providing and conditioning said salt water spray for continuous application to the lobsters in said containers, the containers being quickly disconnected from said shipboard system and connected into an alternate mobile system for transportation on land, and then after transport disconnected from the land transport system and connected into a stationary storage system for storage and sale of the lobster while being continuously sprayed with said life-sustaining salt water in each system.

6. The method of maintaining fresh-caught lobsters alive and healthy for long periods of time, comprising disposing the fresh-caught lobsters upon foraminous trays in containers, said trays having unobstructed open mesh screen surfaces through which spray water and lobster waste may continuously drain, spraying each of said trays, wherein said spray water passes immediately through the open mesh surfaces of said trays, each of said containers being provided with means for quick connection into and quick disconnection from a series of several systems disposed aboard ship, on a transport vehicle and on land for storage and sale of the lobsters, each system including means for controlling the composition and condition of the salt water, filtering the salt water, adjusting the temperature of said salt water to the range of 30° to 77° F for inshore lobster and 30° to 45° F for offshore lobster, aerating said salt water under pressure with an oxygen-containing gas, and passing said conditioned salt water as a spray downward upon each lobster to maintain the lobster continuously wet with said spray water during their lifetime as disposed in said containers, beginning from the time the lobsters are caught and placed in said containers aboard ship, including transport transport from the ship, up to the time they are sold at a land-based market.

7. The method of preserving fresh-caught lobsters in live, healthy condition over an extended period of time, comprising providing similar independent systems for conditioning and aerating salt water and supplying said salt water under spraying pressure for spray upon lobsters, said systems being alternately disposed aboard ship for use in preserving the lobsters alive during the period when the lobsters are being caught, a second system disposed aboard a mobile transport vehicle for maintaining the lobster alive during transportation and at least one other such system for maintaining the lobster alive at a stationary site inland during storage while the lobster is awaiting final disposition by sale, comprising disposing said lobsters on foraminous trays in a closed container having nozzle means for spraying each lobster, said trays having unobstructed open mesh screen surfaces through which spray water and lobster waste may continuously drain, wherein said spray water passes immediately through the open mesh surfaces of said trays, said container having quick connect and quick disconnect means for installation into one of said systems and quick disconnect for removal therefrom and transfer to another of said systems, each system providing a salt water spray for each tray for continuously maintaining said lobster wet with salt spray thereby maintaining the lobster in live, healthy condition in said container, conditioning said salt water by each system to a temperature of 30° to 77° F for inshore lobster, and 30° to 45° F for offshore lobster, and aerating said salt water prior to spray with an oxygen-containing gas under pressure to impart a dissolved oxygen content to the water of at least 4 parts per million, said salt water continuously sprayed upon said lobster being selected from the group consisting of natural ocean salt water and synthetic salt water formed by providing fresh water with an added salt content in the range of 20 to 40 parts per thousand, the salt thereof approximating the salt composition of natural ocean salt water, supplying the lobster to said containers as they are caught aboard ship, and then continuously sprayed aboard ship, transferring said containers from shipboard to mobile transport through its quick disconnect and connect means, transporting the lobster therein while being sprayed by the mobile transport system sufficient to maintain said lobster continuously wet with spray and then similarly transferring the lobster container-wise from the transport system to the stationary system inland, and again providing said salt water spray to maintain said lobsters continously wet until the lobster is sold.

8. A combination of a series of systems for supporting live lobsters in healthy condition over long periods of time, comprising a system disposed aboard ship wherein the lobster is caught, a system disposed aboard a land transport vehicle wherein the lobster is transported to its destination, and a storage system disposed inland wherein the lobster are stationarily stored until sold, a set of several containers each having duct means for conveying and spraying life-sustaining salt water solution over lobsters supported therein substantially to maintain said lobster continuously wet by said spray over the life of the lobsters, said containers each having several foraminous trays having large open mesh surfaces through which spray water and lobster waste may continuously drain from lobsters separately disposed thereon for continuous spraying, spraying each of said trays, wherein said spray water passes immediately through the open mesh surfaces of said trays, quick connect and disconnect means on each container for connecting it into one of said system, and disconnecting for transfer to another of said systems, each of said systems including means for supplying salt water, a source of oxygen-containing gas under pressure and means for aerating said salt water with said oxygen-containing gas to impart an oxygen content at least four parts per million to said salt water, means for purifying and storing said salt water, means for controlling the temperature of said salt water, means for passing said conditioned salt water to each quick-disconnect container whereby the containers of live lobster may be connected and disconnected in quick transfer between said several systems, the ship in which the lobster is caught, and then a transportation system in which it is transported to the site where it is stored, and then in said storage and disposal site while maintaining said lobster substantially continuously wet by spraying the lobster with life-sustaining conditioned salt water.

9. The combination as defined in claim 8 wherein each container has an outlet drain for waste water, and each system includes means for collecting and conducting away accumulated waste waters.

10. The method of preserving fresh caught shell fish in live and healthy condition over an extended period of time, comprising spraying the live shell fish to maintain said shell fish continuously wet by said spray over the total period from the time it is caught until sale with a life-supporting spray of salt water selected from the group consisting of natural ocean salt water and synthetic salt water, said synthetic ocean salt water consisting of fresh water having added a salt content in the range of 20 to 40 parts per thousand approximating the salt content composition of natural salt water, said salt water being controlled to a temperature in the range of 30° to 77° F, said salt water being aerated under pressure with an oxygenated gas prior to spraying upon the shell fish to impart a dissolved oxygen content to the water exceeding about 4 parts per million, said salt water spray being the sole life sustaining medium applied as a continuously wetting spray upon the surfaces of the separate shell fish, supporting said shell fish upon foraminous trays having large open mesh screen-like surfaces from which water and wastes may continuously drain, and spraying each of said trays, wherein said spray water passes immediately through the open mesh surfaces of said trays.

11. A combination of a series of systems for supporting live shell fish in healthy condition for extended periods of time, comprising a system disposed aboard ship wherein the shell fish is caught, a system disposed aboard a land transport vehicle wherein the shell fish is transported to its destination, and a storage system in-land wherein the shell fish is stationarily stored until sold, a set of several containers, each container having several foraminous trays mounted horizontally therein, said trays comprising unobstructed, open mesh screen-like surfaces through which spray wter and shell fish wastes may continuously drain as the shell fish supported in said trays are sprayed, said containers each having duct means for conveying and spraying life sustaining salt water solution over shell fish supported therein to maintain said shell fish continuously wet by said spray over the life of the shell fish, quick connect and disconnect means on each container for connecting it into one of said systems, and disconnecting for transfer to another of said systems, each of said systems including means for supplying salt water, a source of oxygen containing gas under pressure and means for aerating said salt water with said oxygen containing gas to impart an oxygen content of at least 4 parts per million to said salt water, means for purifying and storing said salt water, means for controlling the temperature of said salt water, means for passing said conditioned salt water to each quick-disconnect container whereby the containers of live shell fish may be connected and disconnected in quick transfer between said several systems, the ship in which the shell fish is caught, and then a transportation system in which it is transported to the site where it is stored, and then in said storage and disposal site while spraying shell fish to maintain them continuously wet with life sustaining conditioned salt water spray, wherein said spray water passes immediately through the open mesh surfaces of said trays.

* * * * *